(12) United States Patent
Strogov et al.

(10) Patent No.: US 11,250,126 B2
(45) Date of Patent: Feb. 15, 2022

(54) SYSTEMS AND METHODS FOR ANALYZING PROCESS CHAINS TO DETECT MALICIOUS BEHAVIOR

(71) Applicant: Acronis International GmbH, Schaffhausen (CH)

(72) Inventors: Vladimir Strogov, Moscow (RU); Vyacheslav Levchenko, Moscow (RU); Serguei Beloussov, Costa del Sol (SG); Sergey Ulasen, Moscow (RU); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 310 days.

(21) Appl. No.: 16/581,952

(22) Filed: Sep. 25, 2019

(65) Prior Publication Data

US 2020/0104486 A1  Apr. 2, 2020

Related U.S. Application Data

(60) Provisional application No. 62/738,417, filed on Sep. 28, 2018.

(51) Int. Cl.
*G06F 21/55* (2013.01)

(52) U.S. Cl.
CPC ...... *G06F 21/554* (2013.01); *G06F 2221/032* (2013.01)

(58) Field of Classification Search
CPC .......................... G06F 21/554; G06F 2221/032
See application file for complete search history.

(56) References Cited

U.S. PATENT DOCUMENTS

| | | | |
|---|---|---|---|
| 7,756,834 B2 * | 7/2010 | Masters | G06F 21/568 707/640 |
| 8,181,247 B1 * | 5/2012 | Pavlyushchik | G06F 21/566 726/22 |
| 9,419,996 B2 * | 8/2016 | Porat | G06F 21/566 |
| 9,894,085 B1 * | 2/2018 | Dmitriyev | H04L 63/1416 |
| 10,462,160 B2 * | 10/2019 | Arzi | G06F 21/566 |
| 2017/0124319 A1 * | 5/2017 | Peleg | G06F 21/554 |
| 2018/0121453 A1 * | 5/2018 | Jain | G06F 11/1448 |
| 2018/0357133 A1 * | 12/2018 | Strogov | G06F 21/566 |
| 2021/0240828 A1 * | 8/2021 | Gaurav | G06F 21/565 |

* cited by examiner

*Primary Examiner* — Christopher A Revak
(74) *Attorney, Agent, or Firm* — Arent Fox LLP; Michael Fainberg

(57) ABSTRACT

Disclosed herein are systems and method for malicious behavior detection in processing chains comprising identifying a chain of related processes executing on a computing device; for each respective process in the chain of related processes: monitoring events generated by the respective process; storing snapshots of data modified by any of the events; determining a level of suspicion for the respective process by applying an artificial intelligence (AI) model to the snapshots of data; determining whether the chain of related processes is trusted based on the determined levels of suspicion; and in response to determining that the chain of related processes is not trusted, restoring objects affected by the chain from the snapshots.

19 Claims, 7 Drawing Sheets

SYSTEMS AND METHODS FOR ANALYZING PROCESS CHAINS TO DETECT MALICIOUS BEHAVIOR

CROSS-REFERENCE TO RELATED APPLICATIONS

This application claims the benefit of U.S. Provisional Application No. 62/738,417 filed on Sep. 28, 2018, which is hereby incorporated in its entirety, herein.

FIELD OF TECHNOLOGY

The present disclosure relates generally to the field of data security, and more specifically, to systems and methods for analyzing process chains to detect malicious behavior.

BACKGROUND

In general, many existing software solutions for data protection and security lack behavioral (or, in other words, dynamic) analysis to protect data. They typically use different heuristic methods to detect any malicious programs and disable them (remove or isolate from user data). Such heuristic methods are usually based on some typical characteristics and symptoms, defined by computer security experts and analytics. The given methods can work well in some user environments, but the efficiency of these methods can sufficiently degrade in other environments.

Thus, there is a need in the art for systems and methods that increase the effectiveness of protection against malicious behavior in varying computer environments by replacing conventional heuristics with dynamic models for detecting malicious programs.

SUMMARY

Aspects of the disclosure relate to the field of data security. In particular, aspects of the disclosure describe methods and systems for malicious behavior detection in processing chains.

In one exemplary aspect, a behavior analyzing module identifies a chain of related processes executing on a computing device. For each respective process in the chain of related processes, the behavior analyzing module monitors events generated by the respective process, stores snapshots of data modified by any of the events, and determines a level of suspicion for the respective process by applying an artificial intelligence (AI) model to the snapshots of data, wherein the level of suspicion is a likelihood of the respective process being attributed to malware based on the data modified by any of the events. Based on the determined levels of suspicion, the behavior analyzing module determines whether the chain of related processes is trusted. In response to determining that the chain of related processes is not trusted, the behavior analyzing module restores objects affected by the chain from the snapshots.

In one aspect, identifying the chain of related processes comprises of the behavior analyzing module identifying at least two processes with a relationship comprising one or more of: a parent-child relationship, an injector-injected relationship; a software-component relationship; and a process-thread relationship.

In one aspect, the chain of related processes comprises a first process with a first level of suspicion. The behavior analyzing module determines the chain of related processes is not trusted in response to determining that (1) the first level of suspicion is below a predetermined threshold value and (2) all remaining processes in the chain are sub-processes of the first process.

In one aspect, the behavior analyzing module determines that the chain of related processes is not trusted by identifying a first amount of processes in the chain that have respective levels of suspicion each below a predetermined threshold value and determining that the first amount of processes is greater than a threshold amount of untrusted processes.

In one aspect, the chain of related processes comprises a first process and a sub-process of the first process. The behavior analyzing module, in response to determining that (1) a first level of suspicion of the first process is less than a predetermined threshold value and (2) a second level of suspicion of the sub-process is greater than the predetermined threshold value, isolates the sub-process from the chain of related processes for further monitoring and determines that the updated chain of related processes (i.e., with the sub-process now isolated) is trusted.

In one aspect, in response to determining that the chain of related processes is trusted, the behavior analyzing module deletes the snapshots and ceases the monitoring.

In one aspect, in response to determining that the chain of related processes is trusted, the behavior analyzing module marks the chain of related processes as trusted and in response to determining that the chain of related processes is not trusted, the behavior analyzing module marks the chain of related processes as not trusted.

In one aspect, the objects comprise one or more of files, records, system settings, task queues, or database records.

In one aspect, the AI model is configured to determine the level of suspicion based on training data comprising historic events pre-classified by trustworthiness.

In one exemplary aspect, a non-transitory computer-readable medium is provided storing a set of executable instructions thereon for the malicious behavior detection described in the aspects above.

In one exemplary aspect, a system is provided comprising a hardware processor configured to perform the malicious behavior detection described in the aspects above.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more exemplary aspects of the present disclosure and, together with the detailed description, serve to explain their principles and implementations.

DETAILED DESCRIPTION

Exemplary aspects are described herein in the context of a system, method and computer program product for analyzing process chains to detect malicious behavior. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Certain aspects of the present disclosure provide a system and method that monitor chains of software components such as processes, threads and modules that are related, through various types of relationships. Each of these chains is monitored and events generated by components in each of the chains are analyzed to determine whether the events are malicious or not. The events may comprise modifications to any object (e.g., file, record, or the like) that is accessed by components in each of the chain, modifications to system settings, system tasks, scheduled tasks and the like. Other examples of events include file I/O, process/thread notifications, network events, and intercepted API calls with the help of various technologies (e.g., for Windows, events may be user-mode hooking or driver assisted hypervisor enabled interceptions).

Figure 1:
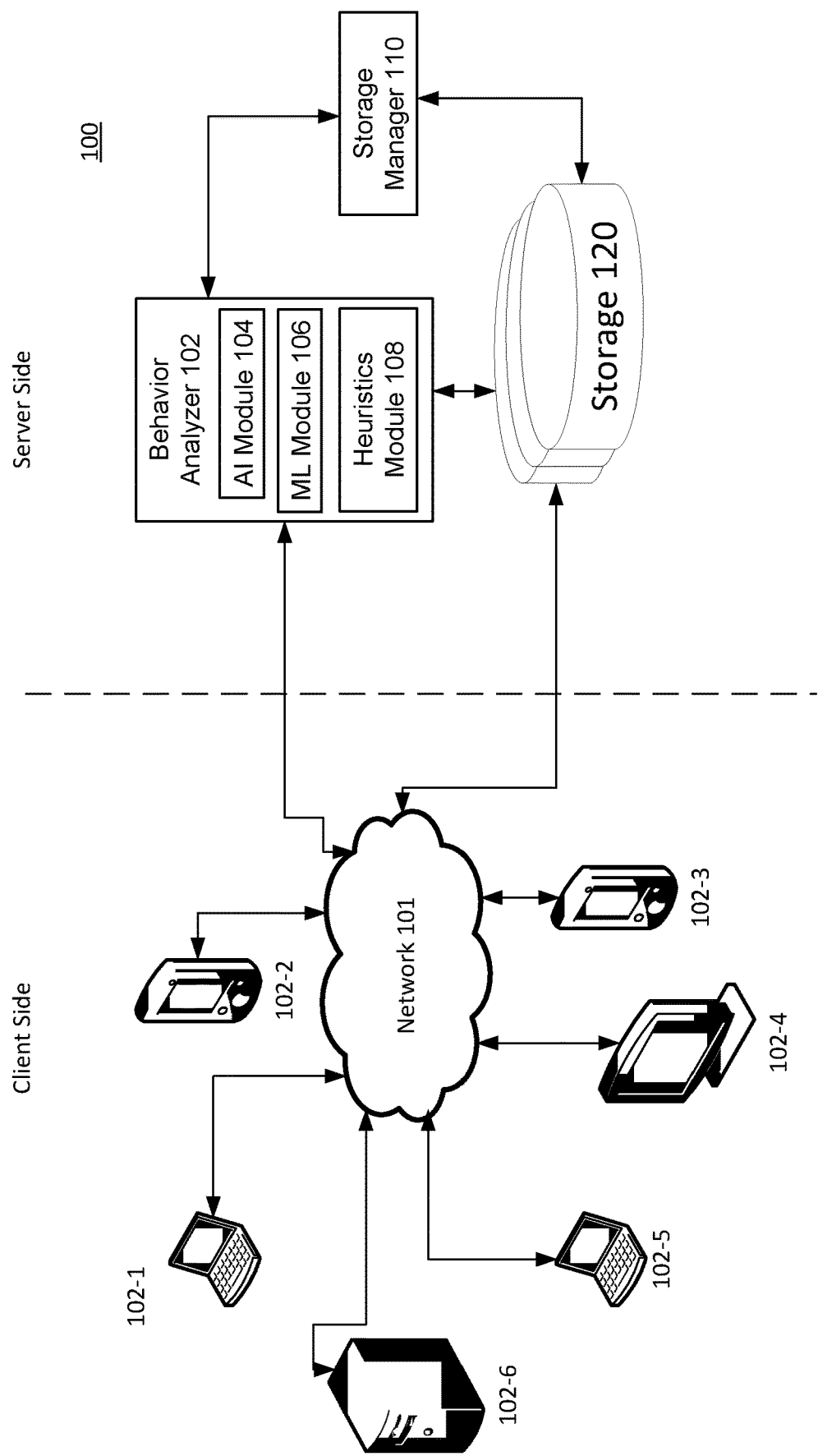
FIG. 1 is a block diagram illustrating a system for analyzing process chains to detect malicious behavior, in accordance with exemplary aspects of the present disclosure.

FIG. 1 is a block diagram illustrating a system 100 for analyzing process chains to detect malicious behavior, in accordance with exemplary aspects of the present disclosure.

The system 100 comprises a client side and a server side, the client side comprising a plurality of devices such as laptop 102-1, mobile device 102-2, mobile device 102-3, server 102-4, laptop 102-5 and server 102-6, collectively referred to as devices 102. Each of the devices 102 are coupled to one or more other devices in devices 102 and to the server side via the network 101. Network 101 may be the Internet, a mobile phone network, a data network (e.g., a 4G or LTE network), Bluetooth, or any combination thereof. For example, the server side may be part of a cloud computing environment accessed via the Internet, or may be part of a local area network (LAN) with devices 102. The lines connecting the server side and devices 102 to network 101 represent communication paths, which may include any combination of free-space connections (e.g., for wireless signals) and physical connections (e.g., fiber-optic cables).

In exemplary aspects of the present disclosure, the server side may comprise a behavior analyzer 102 and storage devices 120.

The behavior analyzer 102 analyzes behavior of the various devices 102 to determine whether there is activity on the devices indicative of malicious behavior. For example, each of the devices may have a plurality of software applications executing thereon. Each of these applications may have one or more components which are executing via various processes of the Operating System (OS) of the device. Further, each process runs on a particular thread provided by the OS and may execute a particular module of the software application. In some aspects, the software application may generate input/output (IO) events which read system settings, write system settings, adjust system tasks, schedule tasks to be executed, access and modify files, database records, and the like.

Each of the processes performing the described events on the devices 102 are also monitored by the behavior analyzer 102. Further, processes that are spawned by software applications (e.g., child processes), and processes spawned by those child processes are also monitored by the behavior analyzer. Collectively, the behavior analyzer monitors chains of processes, threads and modules associated with a software application, e.g., processes, the processes they spawn, the threads that execute these processes, and the module and components that are executed. Each of these processes, threads and modules in these chains may access particular system settings, files, resources, or the like, as described above.

The behavior analyzer 102 further monitors access to the resources that a chain may modify. The behavior analyzer 102 generates a requests to the storage manager 110 to generate a snapshot that captures the resource prior to being modified. According to one aspect, this is achieved by using copy-on-write snapshotting, where a snapshot is not written immediately. A map of the snapshot is first created and the snapshot is written as late as possible, during the "write" operation to the disk itself.

The behavior analyzer 102 comprises various modules according to one aspect of the disclosure. In this aspect, the behavior analyzer 102 comprises an AI module 104, an ML module 106 and a heuristics module 108.

The AI module 104 processes each event generated in the chains described above, and comes to a decision regarding maliciousness regarding each event. The ML Module 106 monitors each AI decision, trains and retrains a model (e.g., classification, regression, etc.) according to the newly made decisions regarding maliciousness. According to one aspect, the model used by the ML Module 106 is pre-trained on a set of trusted and untrusted data. AI Module 104 generates subsequent decisions using the model updated by the ML Module 106. Resultantly, each successive decision made by the AI Module 104 is more accurate than the previous decision, as it is based on categorized and processed decisions, previously reached. Finally, the behavior analyzer 102 comprises a heuristics module 108 that can determine, or aid the AI module 104 in determining whether an event is malicious based on a set of rules that are predetermined by an administrator and are modified continuously according to the ML Module 106.

In one aspect, the behavior analyzer 102 may modify the policy of monitoring events and snapshotting resources based on a current state of the behavior analyzer 102 being used to track a chain of processes. The AI module 104 determines a level of suspicion, which may be a quantitative (e.g., 3, 2, 1) or qualitative (e.g., "high," "medium," "low") value, that represents the amount of monitoring to perform on a particular process in the chain of processes. Further, the level of suspicion determines the aggressiveness of the snapshotting. In some aspects, snapshotting can be "on" or "off", while in other aspects, more granular snapshotting may be configured. For example, a chain of processes may comprise three levels, namely, process 0, sub-process 1, and sub-process 2. Sub-process 1 may be a child process of process 0 and sub-process 2 may be a child process of sub-process 1. If process 0 is deemed malicious by the AI Module 104, behavior analyzer 102 may assign a level of suspicion of "high" to all three processes. This is because the parent process has been deemed malicious and thus, the child processes cannot be marked as non-malicious. In contrast, if sub-process 2 is deemed malicious by the AI Module 104, the behavior analyzer 102 may assign a level of suspicion of "high" to sub-process 2, "medium" to sub-process 1, and "low" to process 0. This is because the maliciousness of a child process does not necessarily indicate that the whole parent process is malicious. In some aspects, the behavior analyzer 102 may thus determine the level of suspicion based on the level of the process in the chain such that all child processes of a malicious process are prime suspects for maliciousness, but parent processes of a malicious sub-process are less likely suspects for maliciousness. In the latter case, the higher away a process is from the level with the malicious sub-process, the lower the level of suspicion will be as determined by the behavior analyzer 102. Each level of suspicion can be compared with a predetermined threshold value (e.g., a minimum level of suspicion to indicate that the process is malicious) and depending on the level of the process deemed malicious and/or the amount of processes deemed malicious, a decision can be made on whether the chain as a whole can be trusted or not.

According to some aspects, the client devices may comprise user devices, server devices, or a combination of both, and the devices may be coupled to a home network, a company local area network or a wide area network. Aspects of this disclosure are applicable to any network configuration known to those of ordinary skill in the art. In some aspects, the behavior analyzer 102 or storage 120 may reside on the client side, while in other aspects, only the storage 120 resides on the client side.

Figure 2:
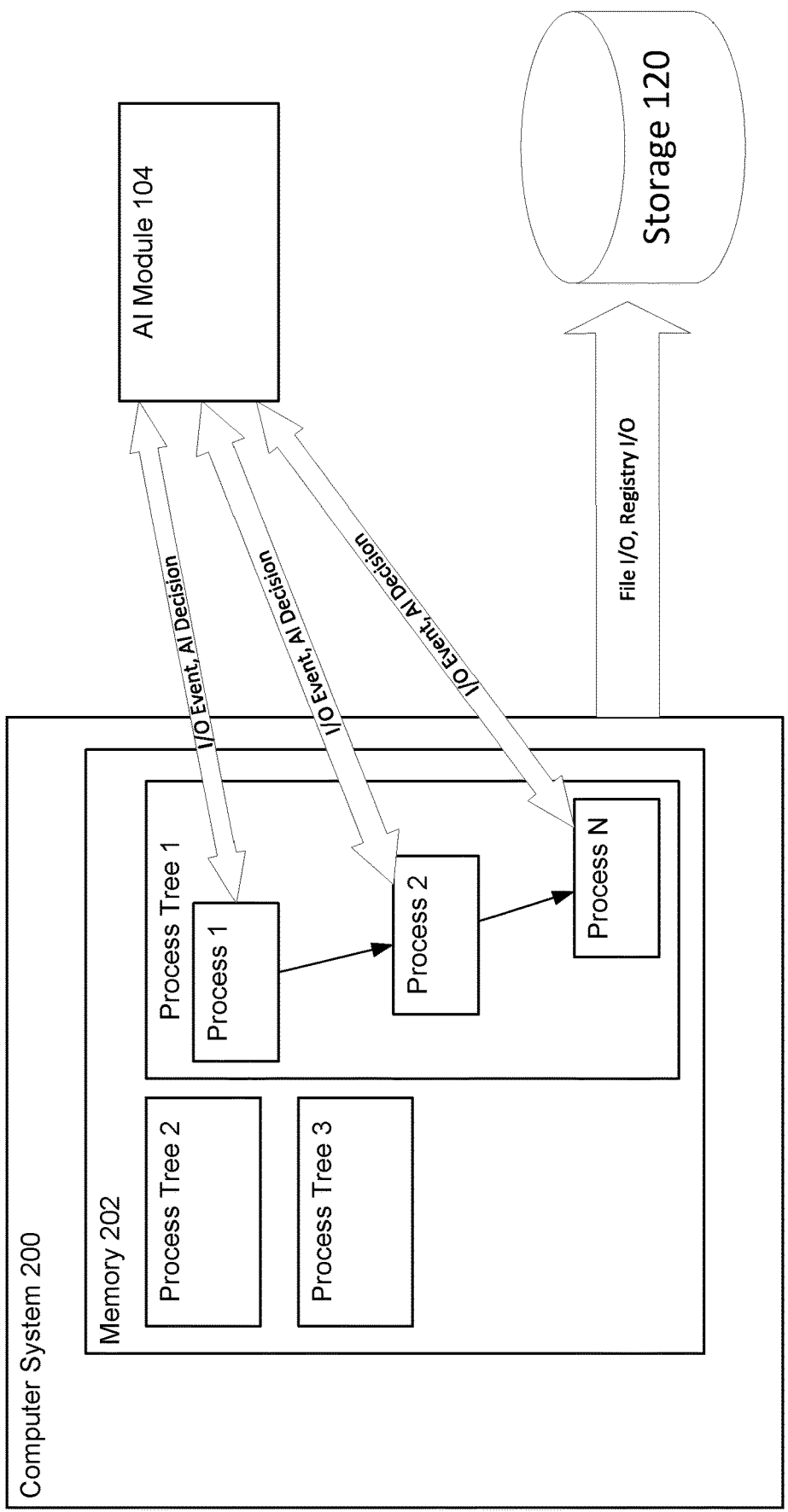
FIG. 2 is a block diagram illustrating various processes interacting with the Artificial Intelligence (AI) Module and storage systems, in accordance with exemplary aspects of the present disclosure.

FIG. 2 is a block diagram illustrating various processes interacting with the AI Module and storage systems, in accordance with exemplary aspects of the present disclosure.

The computer system 200 comprises memory 202 where processes are executed. A single process may spawn various child processes, each executing within its own thread. Each process, including the parent and child processes may inject information into other processes outside of the parent-child relationship, or the like.

FIG. 2 illustrates a Process Tree 1 that contains child process 1, child process 2 and child process N. Further, the memory 202 may comprise other executing process tree 2 and process tree 3. Process 1 of process Tree 1 may fire an I/O event that is monitored by the behavior analyzer 102 by passing this event onto the AI module 104. The AI module 104 analyzes the event and returns an AI decision regarding the level of suspicion of the event. The AI module 104 analyzes events for each process in Process Tree 1 (e.g., Process 2 until Process N) and aggregates the results. The behavior analyzer 102 continuously performs a calculation to determine a level of suspicion based on each AI decision from the AI module 104 as a decision is reached for each event in the chain of process tree 1. In some aspects, the behavior analyzer 102 then compares the calculation to a threshold value for suspicion. If the level of suspicion exceeds the predetermined threshold value for suspicion, the entire process tree 1 is found to be suspicious. Once the entire process tree 1 is found to be suspicious, all snapshotted files are restored. Attempts are made to stop the process from execution such as killing the entire process Tree 1, or blocking the Process Tree 1 from performing any I/O or modifying resources of computer 200.

On the other hand, if the entire process tree 1 is deemed to be "not suspicious" (e.g., below a threshold, or not fitting a particular signature defining malicious behavior), then the snapshots of all resources modified or accessed by the Process Tree 1 are deleted from storage and the behavior analyzer 102 no longer monitors any processes, components, modules, or the like from Process tree 1. In some aspects, the behavior analyzer 102 may be synchronously or asynchronously monitoring Process Tree 2 and Process Tree 3 in a similar fashion.

As the AI module 104 makes each decision regarding the suspicion of a particular I/O event, the ML module 106 is updating a model (e.g., a neutral network) with the input and output of the decision, in order to improve future decision making by the AI module 104. Similarly, the AI Module 104 may make an I/O decision with the aid of the heuristics module 108 that consults a set of rules to determine maliciousness. In some aspects, the AI module 104 makes a decision regarding suspicion based on the learning of ML module 106 and then compares that decision with a decision reached based purely on the heuristics module 108. If the decision from the AI module 104 differs from the decision by the heuristics module 108, the ML module 106 may learn from the difference and modify the model for suspicion accordingly.

Figure 3:
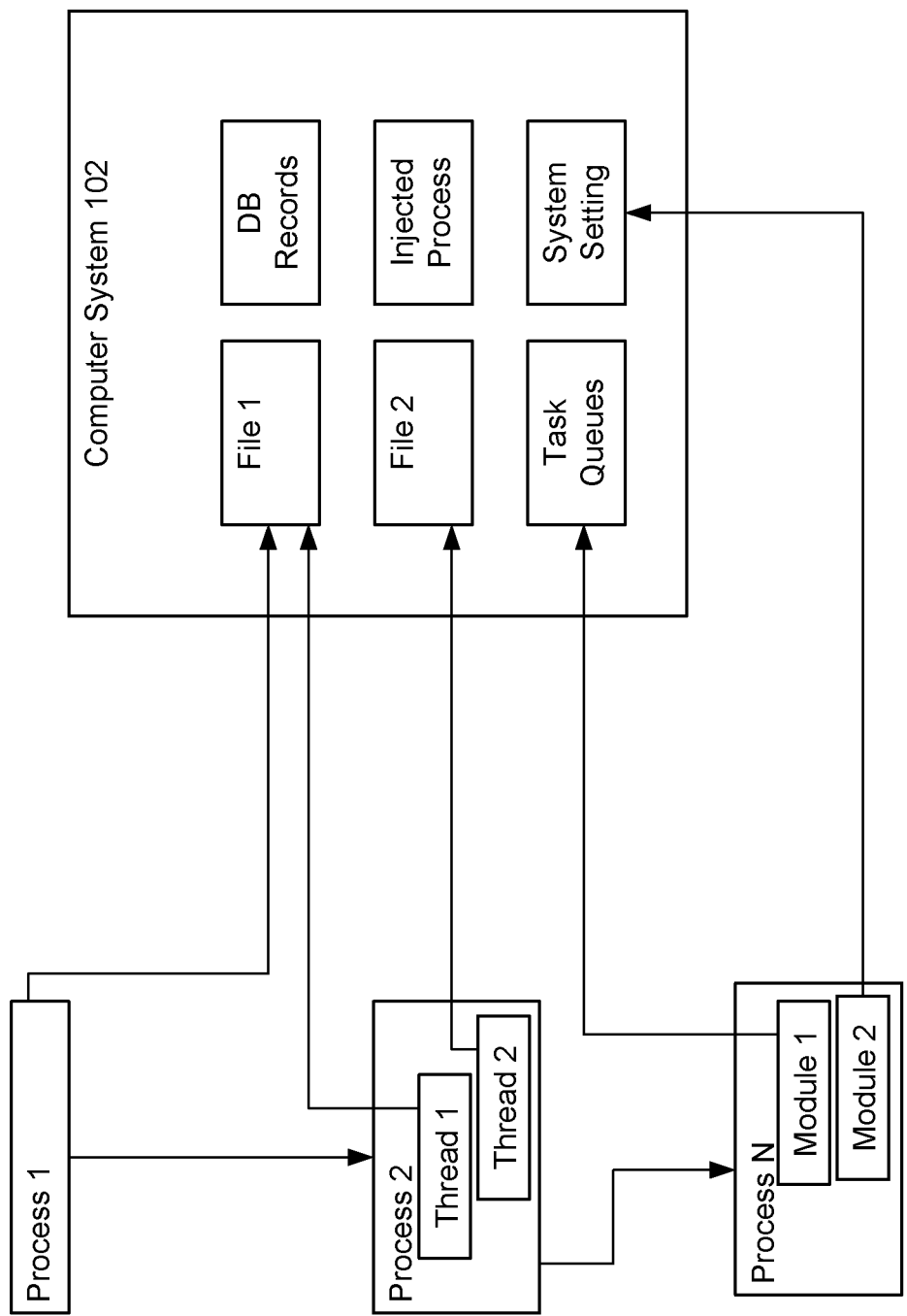
FIG. 3 is a block diagram illustrating the processes accessing various portions of the computer system, in accordance with exemplary aspects of the present disclosure.

FIG. 3 is a block diagram illustrating the processes accessing various portions of the computer system, in accordance with exemplary aspects of the present disclosure.

According to aspects of the present disclosure, the various processes executing on a computer system, e.g. computer system 200, may comprise Process 1, Process 2 to Process N. Process 1 may access various resources on the computer system 102. In the example shown in FIG. 3, Process 1 reads File 1 on the computer system 102 and writes some changes to File 1. Once the process 1 begins accessing File 1, a snapshot of File 1 is created in storage 120.

Process 2 may comprise several components that each execute in individual threads: Thread 1 and Thread 2. Thread 1 may also access file 1 and modify different portions of File 1. Thread 2 is illustrated as currently accessing File 2. Module 1 of Process N is illustrated as accessing task queues on Computer system 102. Module 2 of Process N may access system settings of Computer System 102. In general operation, each of these processes may access other portions of computer system 102 such as database records, other processes, and injected processes or the like.

The above described files, database records, queues, processes, and system settings are all monitored by the behavior analyzer 102 and snapshotted by the storage manager 110 on modification. Accessing each of these particular resources is associated with a level of suspicion. For example, accessing File 1 may be a low-suspicion behavior because File 1 is located in a general user files folder. Accessing File 2, however, may indicate high-suspicion behavior because File 2 is a system folder. Similarly accessing system settings or DB records is indicative of suspicious behavior, and the AI module 104 will decide suspicion accordingly. In some aspects, the above mentioned distinctions are captured in rules implemented by the heuristics module 108.

Figure 4:
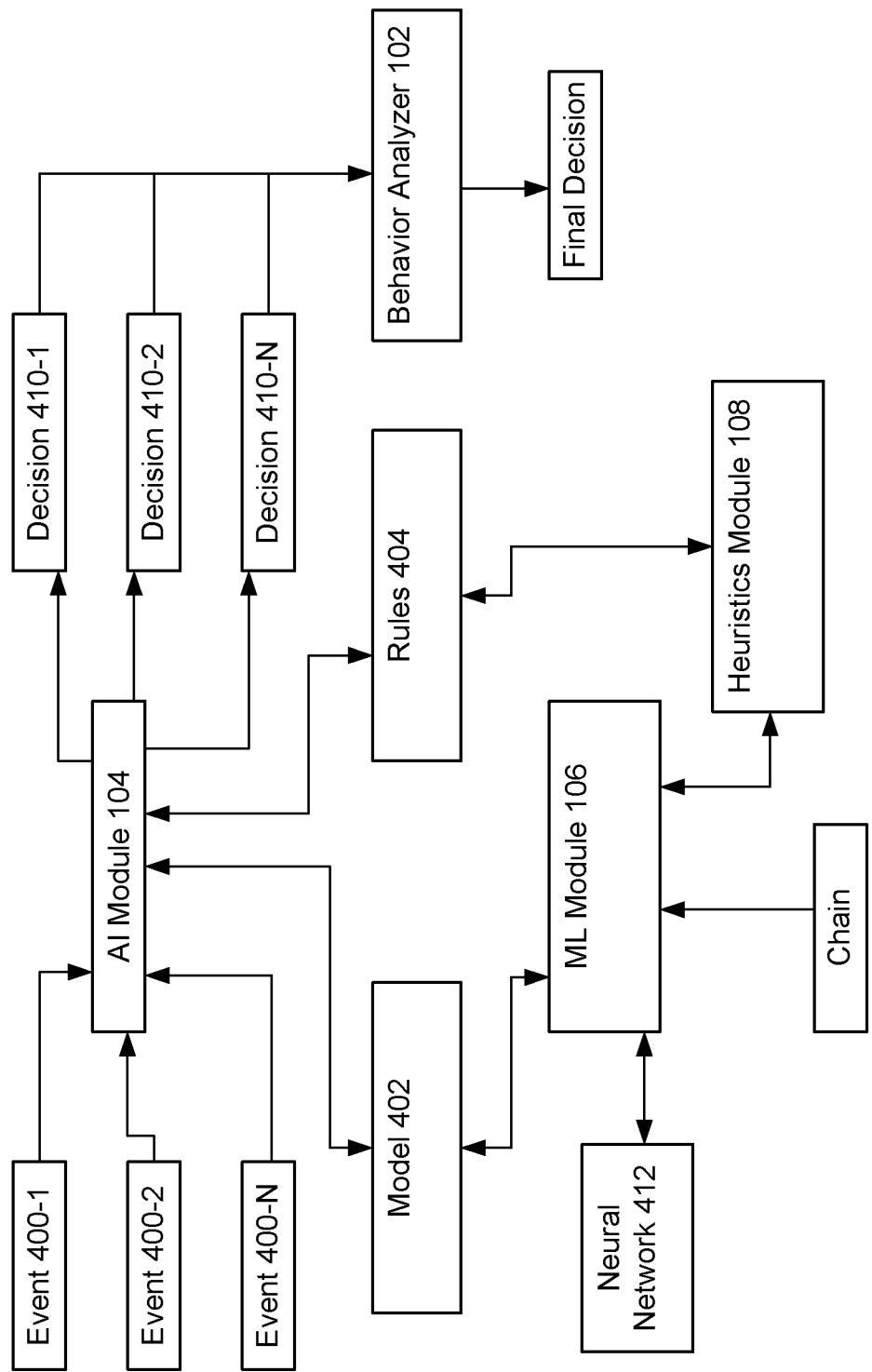
FIG. 4 is a block diagram illustrating the AI Module and the Machine Learning (ML) Module, in accordance with exemplary aspects of the present disclosure.

FIG. 4 illustrates the operation of the AI Module 103 and the ML Module 106, in accordance with exemplary aspects of the present disclosure.

FIG. 4 illustrates the AI Module 104 receiving various events that are monitored by the behavior analyzer 102. For example, Event 400-1 to 400-N represent file access events from process 1 to N shown in FIG. 3. For each event received, the AI Module 104 determines a decision 410-1, 410-2 to 410-N. The decisions 410-1 to N indicate a level of suspicion for the associated event 400-1 to 400-N. Each of these decisions 410-1 to N are aggregated by the behavior analyzer 102 according to a predefined calculation, to see if the level of suspicion for a particular chain of events (chain of processes as shown in FIGS. 2-4) exceeds a particular threshold, or conforms to a particular curve indicating suspicious behavior.

In exemplary aspects, the AI Module 104 determines whether each event 400-1 to 400-N are suspicious based on consulting the Model 402 generated by the ML Module 106, in addition to a set of Rules 404 generated by a heuristics module 108. In some aspects, the heuristics module 108 updates the rules 404 based on the Model 402 generated by the ML Module 106. According to some aspects, the Model 402 is a neural network or a deep learning model.

Figure 5:
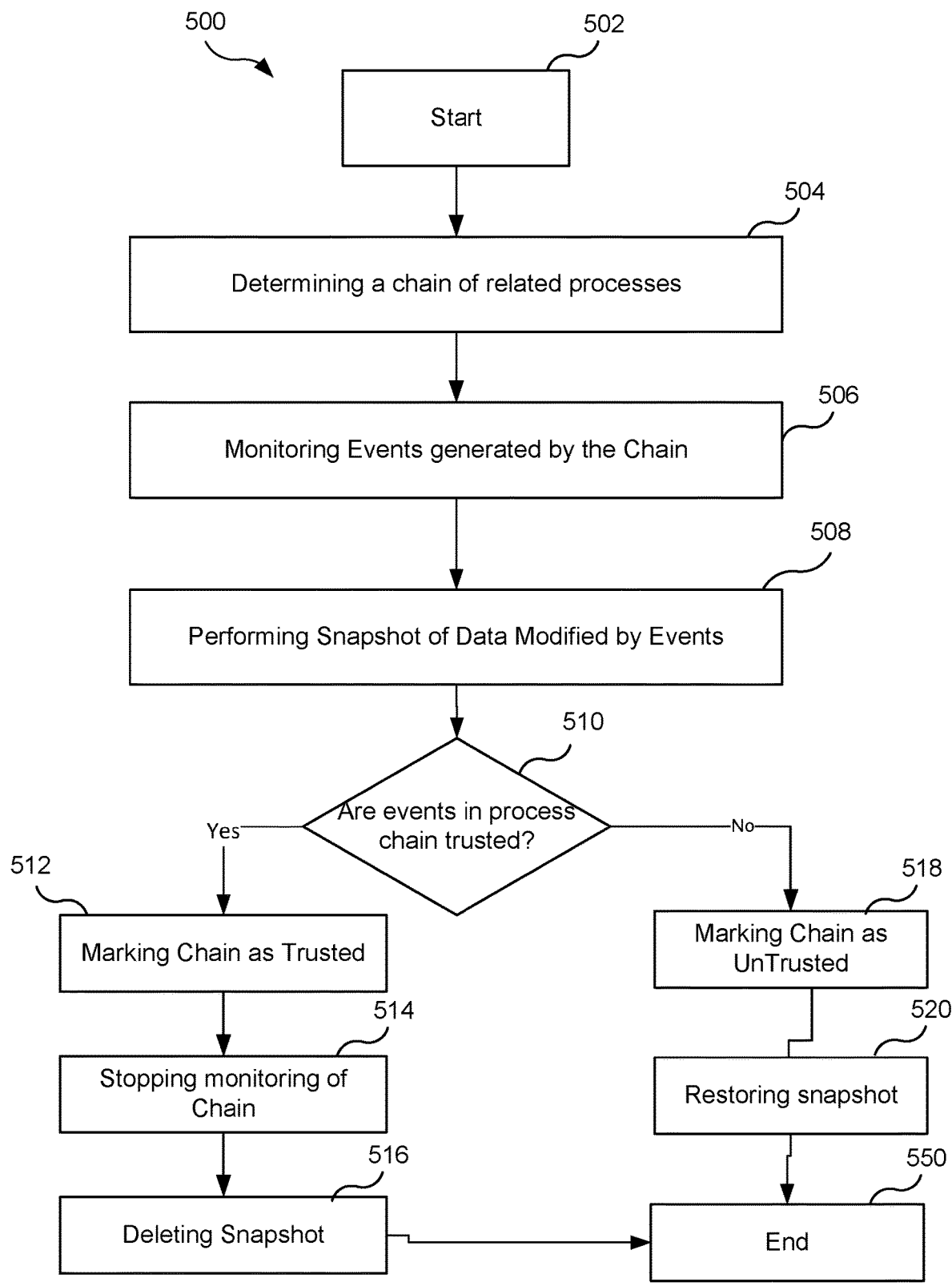
FIG. 5 is a flowchart illustrating a method for analyzing process chains to detect malicious behavior, in accordance with exemplary aspects of the present disclosure.

FIG. 5 is a flowchart illustrating a method 500 for analyzing process chains to detect malicious behavior, in accordance with exemplary aspects of the present disclosure.

The method 500 begins at 502 and proceeds to 504.

At 504, the behavior analyzer 102 determines that a set of processes are related to each other in some way, e.g., they are a chain of related processes. In some aspects, processes are related to their parent processes, their child processes, injector-injected processes, modules or components of software associated with the processes, or threads executing these components.

At 506, the behavior analyzer 102 analyzes all events generated by any process, component, module and/or thread in the chain of related processes. In one aspect, events refer to any action performed by any of the processes, such as I/O events, system events such as spawning a process, network events such as opening or binding sockets, and the like.

The method proceeds to 508, where snapshots are taken of any objects that are modified or accessed by the events. In one aspect, an object includes all computer resources such as files, processes, database records, system settings, event queues, task queues, and the like. The snapshots are stored in storage 120, for example. In one aspect, the storage 120 is storage that is local to a computer whose processes are being analyzed, while in another aspect, the storage 120 may be remote to the computer.

At 510, the method 500 determines whether the events in the chain are trusted or untrusted (e.g., suspicious). According to one aspect, a level of suspicion is determined for each event performed by any process, module, thread or component in the chain of related processes by the AI Module 104. Each level of suspicion is aggregated until enough information is obtained to determine whether the entire process is untrusted or trusted. In other aspects, the AI module 104 improves after each event is analyzed and a decision is made, thus the behavior analyzer 102 may only need to analyze fewer and fewer events after each iteration of previous analysis to come to a conclusion regarding trustworthiness.

If the behavior analyzer determines at 510 that the chain is trusted, the method proceeds to 512 where the chain is marked as trusted. In one aspect, the behavior analyzer 102 keeps a data structure that identifies each chain, and has an associated field indicating trusted or untrusted chains. At step 510, if a chain is trusted, this field is set at step 512.

At step 514, the behavior analyzer 102 ceases monitoring of the chain marked as trusted.

Subsequently, at 516, any snapshots associated with objects accessed or modified by the chain are deleted, because they are no longer considered at risk of being altered maliciously. In one aspect, the chain or process of chains marked as trusted and will no longer be inspected in future executions. In some other aspects, gradations of suspicion are considered. If the process is greater than a certain threshold, but lesser than another threshold, the behavior analyzer 102 may treat the chain differently and not entirely ignore the process chain for analysis in the future. The behavior analyzer 102 may subject the chain to lesser inspection than unknown chains. The method terminates at 550.

If at 510, the chain is determined to be untrusted, the method proceeds to step 518 and is marked as such, according to one aspect in the previously described data structure. At 520, the snapshots of objects that may have been maliciously modified are restored to the computer system 102. The identified process or chain of processes is either killed, suspended or quarantined for further analysis by the behavior analyzer 102. The method terminates at 550.

Figure 6:
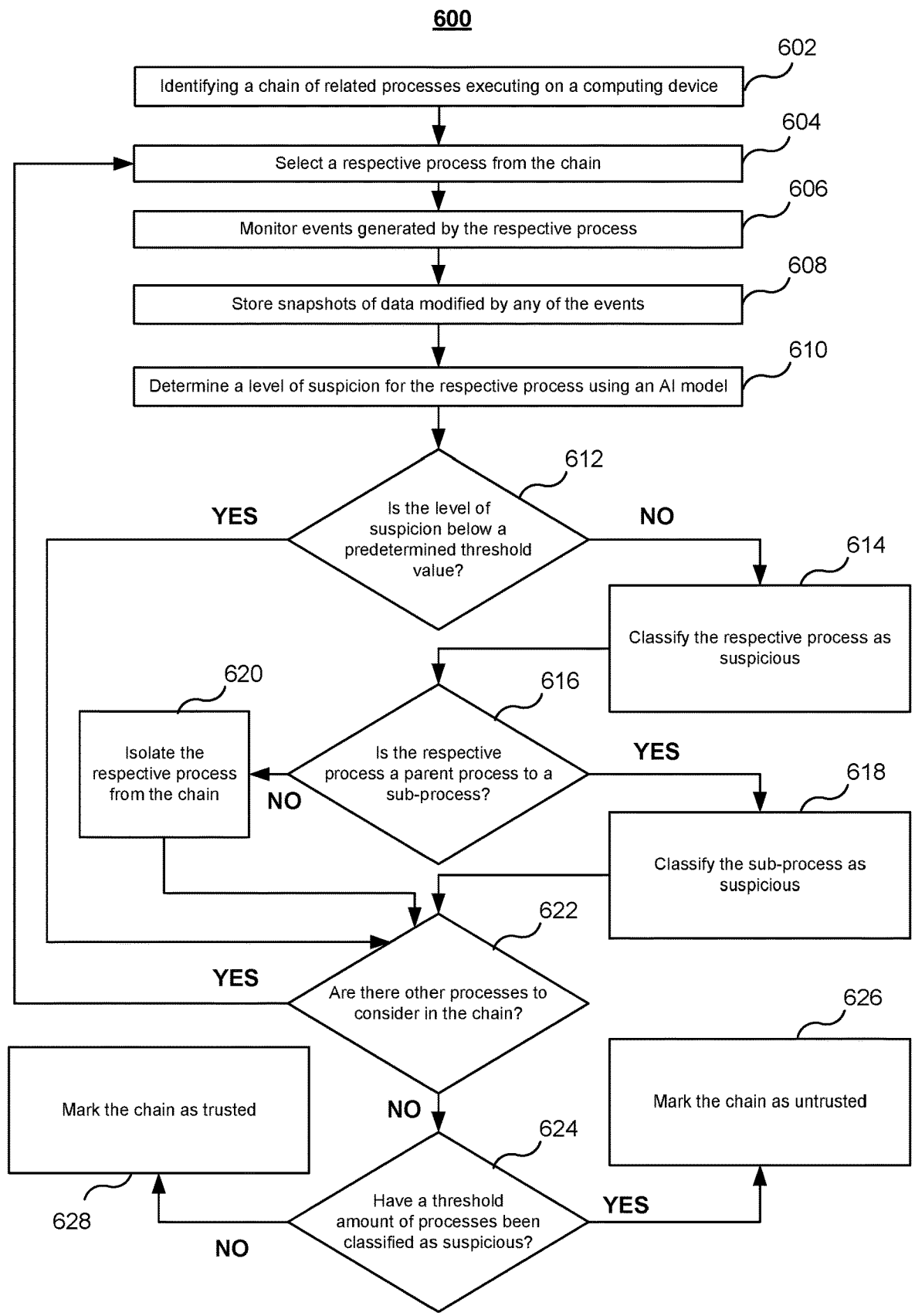
FIG. 6 is a flowchart illustrating a detailed method for analyzing process chains to detect malicious behavior, in accordance with exemplary aspects of the present disclosure.

FIG. 6 is a flowchart illustrating method 600 for analyzing process chains to detect malicious behavior, in accordance with exemplary aspects of the present disclosure. At 602, behavior analyzer 102 identifies a chain of related processes executing on a computing device. For example, consider the following chain: Process 1→Process 2→Process 3, where process 3 is a sub-process of process 2 and process 2 is a sub-process of process 1.

At 604, behavior analyzer 102 selects a respective process from the chain. The selection may be in any arbitrary order. For example, behavior analyzer may start with the parent process, process 1.

At 606, behavior analyzer 102 monitors events generated by the respective process. For example, process 1 may involve accessing and modifying a file. The events associated with the file may involve opening a directory, accessing the file, and performing the modification. At 608, behavior analyzer 102 stores snapshots of data modified by any of the events. For example, behavior analyzer 102 may store in storage manager 110, the file before modification and after modification. At 610, AI module 104 determines a level of suspicion for the respective process. For example, the AI module 104 may be trained to output a level of suspicion (e.g., "high," "medium," "low") based on previously classified data that comprises events that are suspicious and events that are not suspicious. The model used by the AI module 104 may for example be a Bayes classifier. The level of suspicion represents a likelihood of the respective process being attributed to malware based on the data modified by any of the events.

At 612, behavior analyzer 102 determines whether the level of suspicion is below a predetermined threshold value. The predetermined threshold value may be an adjustable qualitative or a quantitative value stored in memory. In this example, the predetermined threshold value may be "medium," indicating that only "low" levels of suspicion can be deemed non-malicious. Suppose that the level of suspicion for process 1 is "high." Because the level of suspicion is below the predetermined threshold value, method 600 proceeds to 614, where behavior analyzer 102 classifies the respective process as suspicious. At 616, behavior analyzer 102 determines whether the respective process is a parent process to a sub-process. In this example, because process 1 is a parent process to process 2, which subsequently is a parent process to process 3, method 600 proceeds to 618 where behavior analyzer 102 classifies the sub-processes (e.g., process 2 and process 3) as suspicious. From here, method 600 advances to 622, where behavior analyzer 102 determines whether there are other processes in the chain to consider. Because all of the processes have been considered in this example, method 600 advances to 624, where behavior analyzer 102 determines whether a threshold amount of processes have been classified as suspicious. The threshold amount of processes represents a minimum amount (e.g., fraction, percentage, etc.) of processes in a chain that need to be classified as suspicious before identifying the entire chain as untrusted. For example, if 66% is the threshold amount, at least 2of 3 processes need to be suspicious. In the example provided, because all three processes are suspicious, method 600 ends at 626, where behavior analyzer 102 marks the chain as untrusted.

Suppose that the level of suspicion of process 1 is "low." From 612, method 600 would advance to 622. At 622, because process 2 and 3 would still need to be considered, method 600 would return to 604. In this example, at 604, behavior analyzer 102 may select process 2 and the method may proceed to 606. Suppose that the level of suspicion at 610 is determined by the AI module 104 to be "low" for process 2. In this case, the method would again loop back from 622 to 604. Lastly, process 3 would be selected.

In this case, supposed that at 610, AI module 104 determines that the level of suspicion for process 3 is "high." Because this value is not less than the predetermined threshold, method 600 would advance to 614 from 612, where behavior analyzer 102 may classify process 3 as suspicious. At 616, behavior analyzer 102 would determine that process 3 is not a parent process to any sub-process. Accordingly, method 600 advances to 620, where behavior analyzer 102 isolates the respective process (e.g., process 3) from the chain. As a result, only 2 processes would remain in the chain. As both of them are not classified as suspicious, at 624, behavior analyzer 102 may determine that the threshold amount of processes has not been classified as suspicious and method 600 ends at 628, where behavior analyzer 102 marks the chain as trusted.

In an example where process 1 is not suspicious and process 2 is classified as suspicious (and in extension process 3 is classified as suspicious), because 2 of 3 processes are suspicious according to the threshold amount, behavior analyzer 102 may mark the chain as untrusted.

Figure 7:
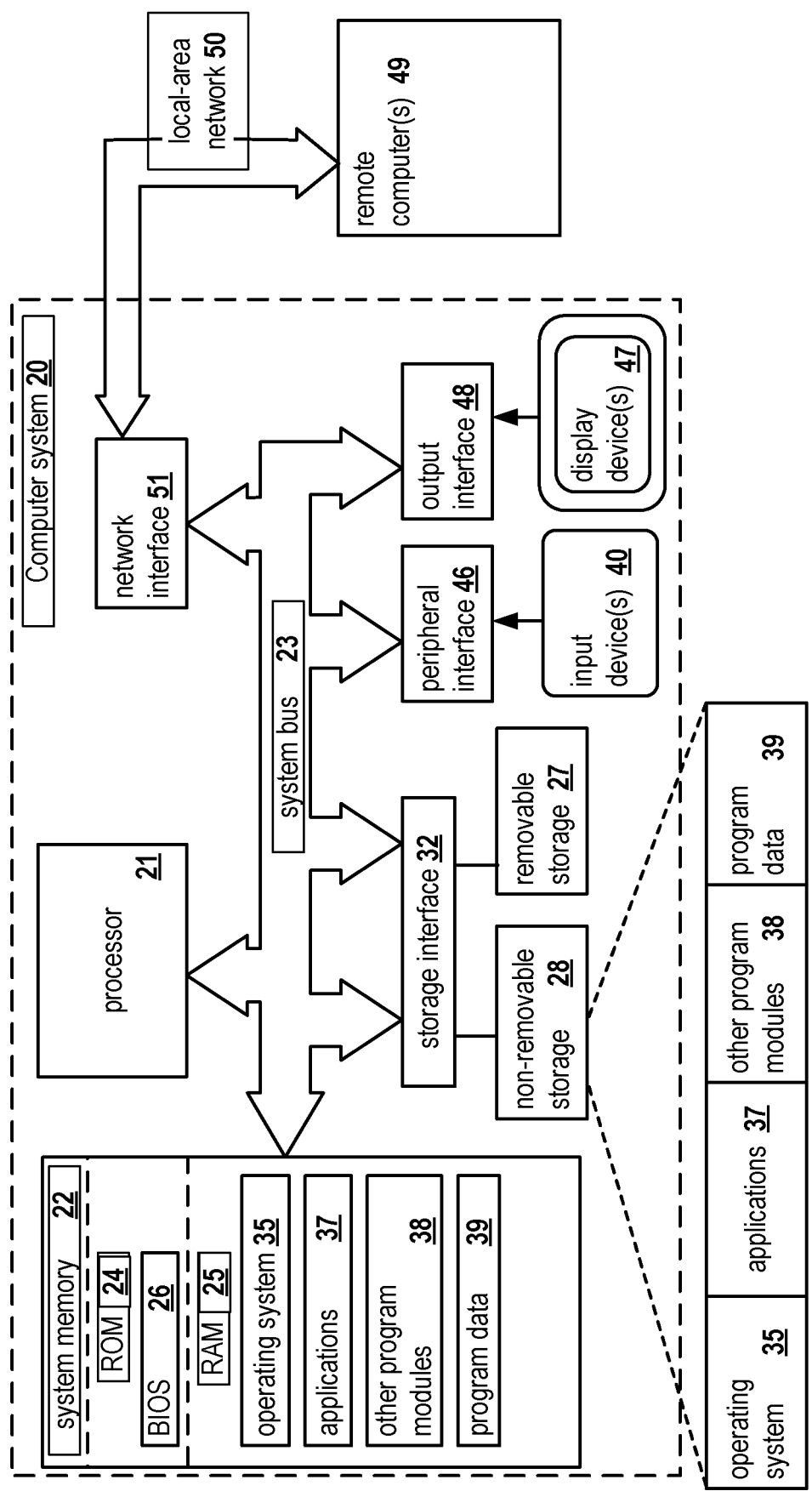
FIG. 7 is a block diagram of a general-purpose computer system on which the disclosed system and method can be implemented according to an exemplary aspect.

FIG. 7 is a block diagram illustrating a computer system 20 (e.g., computer system 200 in FIG. 2, computer system 102 in FIG. 3, or any of the devices of FIG. 1) on which aspects of systems and methods for malicious behavior detection may be implemented in accordance with an exemplary aspect. The computer system 20 may represent computing device 102 and/or backup server 104 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for malicious behavior detection in processing chains, the method comprising:
   identifying a chain of related processes executing on a computing device;
   for each respective process in the chain of related processes:
      monitoring events generated by the respective process;
      storing snapshots of data modified by any of the events;
      determining a level of suspicion for the respective process by applying an artificial intelligence (AI) model to the snapshots of data, wherein the level of suspicion is a likelihood of the respective process being attributed to malware based on the data modified by any of the events;
   determining whether the chain of related processes is trusted based on the determined levels of suspicion;
   in response to determining that the chain of related processes is not trusted, restoring objects affected by the chain from the snapshots.

2. The method of claim 1, wherein identifying the chain of related processes comprises:
   identifying at least two processes with a relationship comprising one or more of:
      a parent-child relationship;
      injector-injected relationship;
      a software-component relationship; or
      a process-thread relationship.

3. The method of claim 1, wherein the chain of related processes comprises a first process with a first level of suspicion, and wherein determining whether the chain of related processes is trusted comprises:
   in response to determining that (1) the first level of suspicion is below a predetermined threshold value and (2) all remaining processes in the chain are sub-processes of the first process, determining that the chain is not trusted.

4. The method of claim 1, wherein determining whether the chain of related processes is trusted further comprises:
   identifying a first amount of processes in the chain that have respective levels of suspicion each below a predetermined threshold value; and
   in response to determining that the first amount of processes is greater than a threshold amount of untrusted processes, determining that the chain of related processes is not trusted.

5. The method of claim 1, wherein the chain of related processes comprises a first process and a sub-process of the first process, and wherein determining whether the chain of related processes is trusted further comprises:
   in response to determining that (1) a first level of suspicion of the first process is less than a predetermined threshold value and (2) a second level of suspicion of the sub-process is greater than the predetermined threshold value:
   isolating the sub-process from the chain of related processes; and
   determining that the chain of related processes is trusted.

6. The method of claim 1, further comprising:
   in response to determining that the chain of related processes is trusted, deleting the snapshots and ceasing the monitoring.

7. The method of claim 1, further comprising:
   in response to determining that the chain of related processes is trusted, marking the chain of related processes as trusted; and
   in response to determining that the chain of related processes is not trusted, marking the chain of related processes as not trusted.

8. The method of claim 1, wherein the objects comprise one or more of files, records, system settings, task queues, or database records.

9. The method of claim 1, wherein the AI model is configured to determine the level of suspicion based on training data comprising historic events pre-classified by trustworthiness.

10. A system for malicious behavior detection in processing chains, the system comprising:
    a hardware processor configured to:
    identify a chain of related processes executing on a computing device;
       for each respective process in the chain of related processes:
       monitor events generated by the respective process;
       store snapshots of data modified by any of the events;
       determine a level of suspicion for the respective process by applying an artificial intelligence (AI) model to the snapshots of data, wherein the level of suspicion is a likelihood of the respective process being attributed to malware based on the data modified by any of the events;
    determine whether the chain of related processes is trusted based on the determined levels of suspicion;
    in response to determining that the chain of related processes is not trusted, restore objects affected by the chain from the snapshots.

11. The system of claim 10, wherein the hardware processor is configured to identify the chain of related processes by:
    identifying at least two processes with a relationship comprising one or more of:
       a parent-child relationship;
       injector-injected relationship;
       a software-component relationship; or
       a process-thread relationship.

12. The system of claim 10, wherein the chain of related processes comprises a first process with a first level of suspicion, and wherein the hardware processor is configured to determine whether the chain of related processes is trusted by:
    in response to determining that (1) the first level of suspicion is below a predetermined threshold value and (2) all remaining processes in the chain are sub-processes of the first process, determining that the chain is not trusted.

13. The system of claim 10, wherein the hardware processor is configured to determine whether the chain of related processes is trusted by:
    identifying a first amount of processes in the chain that have respective levels of suspicion each below a predetermined threshold value; and
    in response to determining that the first amount of processes is greater than a threshold amount of untrusted processes, determining that the chain of related processes is not trusted.

14. The system of claim 10, wherein the chain of related processes comprises a first process and a sub-process of the first process, and wherein the hardware processor is configured to determine whether the chain of related processes is trusted by:
    in response to determining that (1) a first level of suspicion of the first process is less than a predetermined threshold value and (2) a second level of suspicion of the sub-process is greater than the predetermined threshold value:
isolating the sub-process from the chain of related processes for further monitoring; and
determining that the chain of related processes is trusted.

15. The system of claim 10, wherein the hardware processor is configured to:
in response to determining that the chain of related processes is trusted, delete the snapshots and cease the monitoring.

16. The system of claim 10, wherein the hardware processor is configured to:
in response to determining that the chain of related processes is trusted, mark the chain of related processes as trusted; and
in response to determining that the chain of related processes is not trusted, mark the chain of related processes as untrusted.

17. The system of claim 10, wherein the objects comprise one or more of files, records, system settings, task queues, or database records.

18. The system of claim 10, wherein the AI model is configured to determine the level of suspicion based on training data comprising historic events pre-classified by trustworthiness.

19. A non-transitory computer readable medium storing thereon computer executable instructions for malicious behavior detection in processing chains, including instructions for:
identifying a chain of related processes executing on a computing device;
for each respective process in the chain of related processes:
monitoring events generated by the respective process;
storing snapshots of data modified by any of the events;
determining a level of suspicion for the respective process by applying an artificial intelligence (AI) model to the snapshots of data, wherein the level of suspicion is a likelihood of the respective process being attributed to malware based on the data modified by any of the events;
determining whether the chain of related processes is trusted based on the determined levels of suspicion;
in response to determining that the chain of related processes is not trusted, restoring objects affected by the chain from the snapshots.

* * * * *